(12) United States Patent
Koneru et al.

(10) Patent No.: US 12,058,288 B1
(45) Date of Patent: Aug. 6, 2024

(54) SYSTEMS AND METHODS FOR RECOMMENDING DIALOG FLOW MODIFICATIONS AT A CONTACT CENTER

(71) Applicant: KORE.AI, INC., Orlando, FL (US)

(72) Inventors: Rajkumar Koneru, Windermere, FL (US); Prasanna Kumar Arikala Gunalan, Hyderabad (IN); Rajavardhan Nalluri, Hyderabad (IN); Girish Ahankari, Hyderabad (IN); Thirupathi Bandam, Hyderabad (IN); Venkata Praveen Kumar Suvanam, Hyderabad (IN)

(73) Assignee: KORE.AI, INC., Orlando, FL (US)

( * ) Notice: Subject to any disclaimer, the term of this patent is extended or adjusted under 35 U.S.C. 154(b) by 0 days.

(21) Appl. No.: 18/105,075

(22) Filed: Feb. 2, 2023

(51) Int. Cl.
*H04M 3/00* (2006.01)
*G06F 40/40* (2020.01)
*H04M 3/51* (2006.01)

(52) U.S. Cl.
CPC .......... *H04M 3/5175* (2013.01); *G06F 40/40* (2020.01); *H04M 2203/402* (2013.01)

(58) Field of Classification Search
CPC .............................. H04M 3/5175; G06F 40/40
See application file for complete search history.

(56) References Cited

U.S. PATENT DOCUMENTS

| | | | |
|---|---|---|---|
| 8,411,841 B2 | 4/2013 | Edwards et al. | |
| 8,438,089 B1 | 5/2013 | Wasserblat et al. | |
| 10,839,322 B2 | 11/2020 | Pattabhiraman et al. | |
| 2017/0235740 A1 | 8/2017 | Seth et al. | |
| 2017/0344754 A1 | 11/2017 | Kumar et al. | |
| 2018/0165723 A1 | 6/2018 | Wright et al. | |
| 2019/0146647 A1* | 5/2019 | Ramchandran | G06F 40/35 715/758 |
| 2020/0106881 A1* | 4/2020 | Beaver | G06F 40/35 |
| 2022/0156298 A1 | 5/2022 | Mahmoud et al. | |
| 2022/0383153 A1 | 12/2022 | Mahmoud et al. | |

* cited by examiner

*Primary Examiner* — Rasha S Al Aubaidi

(74) *Attorney, Agent, or Firm* — Troutman Pepper Hamilton Sanders LLP

(57) ABSTRACT

A contact center server manages conversation data for a plurality of conversations between agent devices and customer devices and provides to the agent devices, one or more automated response recommendations to one or more customer messages by executing one or more dialog flows. The contact center server, using a classification model, determines for each of the one or more customer messages when there are one or more changes between the corresponding one or more automated response recommendations and corresponding one or more agent responses. Further, the contact center server associates one or more tags to the one or more agent responses when the one or more changes are determined. Subsequently, the contact center server identifies one or more patterns in the one or more tags associated to the one or more agent responses and provides one or more flow modification recommendations to the one or more dialog flows to one or more enterprise user devices based on the identified one or more patterns.

18 Claims, 13 Drawing Sheets

| S. No | Message Type | Message | Expected Output |
|---|---|---|---|
| 1 | Response Recommendation | Sure, I will help you resolve the issue | Empathy Added |
| | Agent Response | I am sorry you are facing this issue. I will help you resolve this as soon as possible | |
| 2 | Response Recommendation | Please reconfirm the < entity name > | Confirmation Message |
| | Agent Response | You are referring to < entity name >, is that correct? | |
| 3 | Response Recommendation | Thank you for contacting us. Have a good day | New Intent - < Intent Name > |
| | Agent Response | Would you like to < intent name >? | |
| 4 | Response Recommendation | What is your device < entity name >? | Additional Message |
| | Agent Response | I am sorry you are facing the issue at this time of the day | |
| 5 | Response Recommendation | I can understand how difficult this must be to you | No Change |
| | Agent Response | I can understand how difficult this must be to you | |

FIG. 2

| User | Message Data | Tag(s) | Response Recommendation(s) |
|---|---|---|---|
| Customer | Hi, I want to transfer funds | | Hello, I will surely help you with that. How much do you want to transfer? ← 604 |
| Human Agent | Hello, I will surely help you with that. How much do you want to transfer? | Used as-is | |
| Customer | $15000. Sorry it is $1500 | | Who is the payee? ← 610 |
| Human Agent | You would like to transfer $1500, is that correct? | Confirmation Message | |
| Customer | Yes | | |
| Human Agent | Who is the payee? | Used as-is | |
| Customer | Alice | | The fund transfer of $1500 from your savings account to Alice has been processed. The payee should receive the funds within an hour. |
| Human Agent | The fund transfer of $1500 from your savings account to Alice has been processed. The payee should receive the funds within an hour. | Used as-is | |

FIG. 6A

| User | Message Data | Tag(s) | Response Recommendation(s) |
|---|---|---|---|
| Customer | I am facing network connectivity issue | Intent – Troubleshoot Router | What is the model number of your router? |
| Human Agent | What is the model number of your router? | Used as-is | |
| Customer | ...... | ...... | ...... |
| Human Agent | ...... | ...... | |
| Customer | Thanks for resolving the issue | | Thank you for contacting us |
| Human Agent | The warranty of your router expires next week. Would you like to renew the warranty? | New Intent – Renew Warranty | |
| Customer | Yes | ...... | |
| Human Agent | ...... | | |

FIG. 6C

| Output of the Classification Model | Tag(s) Associated by the Tagging Engine to the Agent Response Data |
|---|---|
| No Change | Used as-is |
| Confirmation Message | Confirmation Message |
| Empathy Added | Additional Message |
| New Intent - < Intent Name > | New Intent - < Intent Name > |
| New Entity | New Entity |
| Additional Message | Additional Message |

FIG. 7

SYSTEMS AND METHODS FOR RECOMMENDING DIALOG FLOW MODIFICATIONS AT A CONTACT CENTER

FIELD

This technology generally relates to contact centers and, more particularly, to methods, systems, and computer-readable media for recommending dialog flow modifications based on machine assisted human agent conversations at a contact center.

BACKGROUND

Contact centers are a major customer touch point for enterprises. Human agents at contact centers face demanding targets and high stress levels but are expected to provide exemplary customer service. Several contact center technologies have been developed to assist human agents handle customer conversations effectively. The emergence and the recent wide adoption of artificial intelligence based solutions led to the development and usage of machine learning (ML) based agent-assist systems to help the human agents resolve customer queries by recommending relevant responses, knowledge articles, next best actions, and summarizing the conversations that the human agents may review and submit during after-call-work.

However, existing agent-assist systems are not effective in handling complex conversations. Further, to improve the performance, existing agent-assist systems require extensive training and manual configuration to be provided by one or more enterprise users such as, for example, human agents, supervisors, developers, or administrators. In one example, the developers have to manually look into performance insights of the agent-assist system and provide additional training.

Currently, there are mechanisms, such as human agents accepting or rejecting one or more recommendations provided by the agent-assist system or selecting a like or a dislike option for the one or more recommendations provided by the agent-assist system. However, these actions provide limited feedback and insights to the contact centers regarding the performance of the agent-assist system.

Hence, there is a need for systems and methods to improve the recommendations provided to the human agents at the contact centers.

SUMMARY

In an example, the present disclosure relates to a method for monitoring conversations between customers and human agents at a contact center and providing dialog flow modification recommendations to enterprise user devices. The method comprises: managing conversation data for a plurality of conversations between a plurality of agent devices and a plurality of customer devices. Further, recommendation data comprising one or more automated response recommendations to one or more customer messages received as part of the conversation data for the plurality of conversations is provided to the plurality of agent devices by executing one or more dialog flows corresponding to the one or more customer messages. Further, using a classification model, a determination is made for each of the one or more customer messages, when there are one or more changes between the corresponding one or more automated response recommendations and corresponding one or more agent responses transmitted as part of the conversation data for the plurality of conversations. Furthermore, one or more tags are associated to the one or more agent responses when the one or more changes are determined, and one or more patterns are identified in the one or more tags associated to the one or more agent responses. Subsequently, one or more flow modification recommendations to the one or more dialog flows are provided to one or more enterprise user devices based on the identified one or more patterns.

In another example, the present disclosure relates to a contact center server comprising one or more processors and a memory. The memory coupled to the one or more processors which are configured to execute programmed instructions stored in the memory to manage conversation data for a plurality of conversations between a plurality of agent devices and a plurality of customer devices. Further, recommendation data comprising one or more automated response recommendations to one or more customer messages received as part of the conversation data for the plurality of conversations is provided to the plurality of agent devices by executing one or more dialog flows corresponding to the one or more customer messages. Further, using a classification model, a determination is made for each of the one or more customer messages, when there are one or more changes between the corresponding one or more automated response recommendations and corresponding one or more agent responses transmitted as part of the conversation data for the plurality of conversations. Furthermore, one or more tags are associated to the one or more agent responses when the one or more changes are determined, and one or more patterns are identified in the one or more tags associated to the one or more agent responses. Subsequently, one or more flow modification recommendations to the one or more dialog flows are provided to one or more enterprise user devices based on the identified one or more patterns.

In another example, the present disclosure relates to a non-transitory computer readable storage medium having stored thereon instructions which when executed by one or more processors, causes the one or more processors to manage conversation data for a plurality of conversations between a plurality of agent devices and a plurality of customer devices. Further, recommendation data comprising one or more automated response recommendations to one or more customer messages received as part of the conversation data for the plurality of conversations is provided to the plurality of agent devices by executing one or more dialog flows corresponding to the one or more customer messages. Further, using a classification model, a determination is made for each of the one or more customer messages, when there are one or more changes between the corresponding one or more automated response recommendations and corresponding one or more agent responses transmitted as part of the conversation data for the plurality of conversations. Furthermore, one or more tags are associated to the one or more agent responses when the one or more changes are determined, and one or more patterns are identified in the one or more tags associated to the one or more agent responses. Subsequently, one or more flow modification recommendations to the one or more dialog flows are provided to one or more enterprise user devices based on the identified one or more patterns.

BRIEF DESCRIPTION OF THE DRAWINGS

FIG. 2 is a table of exemplary training data that may be used for training a classification model illustrated in FIG. 1B.

FIGS. 6A-6C are tables of exemplary conversations between customers and human agents, tags associated with messages of the conversations and agent-assist response recommendations.

FIG. 7 is a table of an exemplary association between output of the classification model and tags associated by a tagging engine.

DETAILED DESCRIPTION

Examples of the present disclosure relate to contact centers and, more particularly, to one or more components, systems, computer-readable media and methods for improving assistance to human agents and customer service by monitoring real-time conversations between customers and human agents at a contact center server 150. The human agents assist the customers using internal applications, virtual assistants, knowledge bases, group chats, or the like. The human agents are provided with assistance during conversations with the customers by executing one or more dialog flows of one or more intents of the customers. For example, by executing the one or more dialog flows, the contact center server 150 assists a human agent by recommending actions to be taken or responses to be sent to a customer, based on conversation data exchanged between the human agent and the customer, such that the human agent provides quick and efficient assistance to the customer.

Figure 1A:
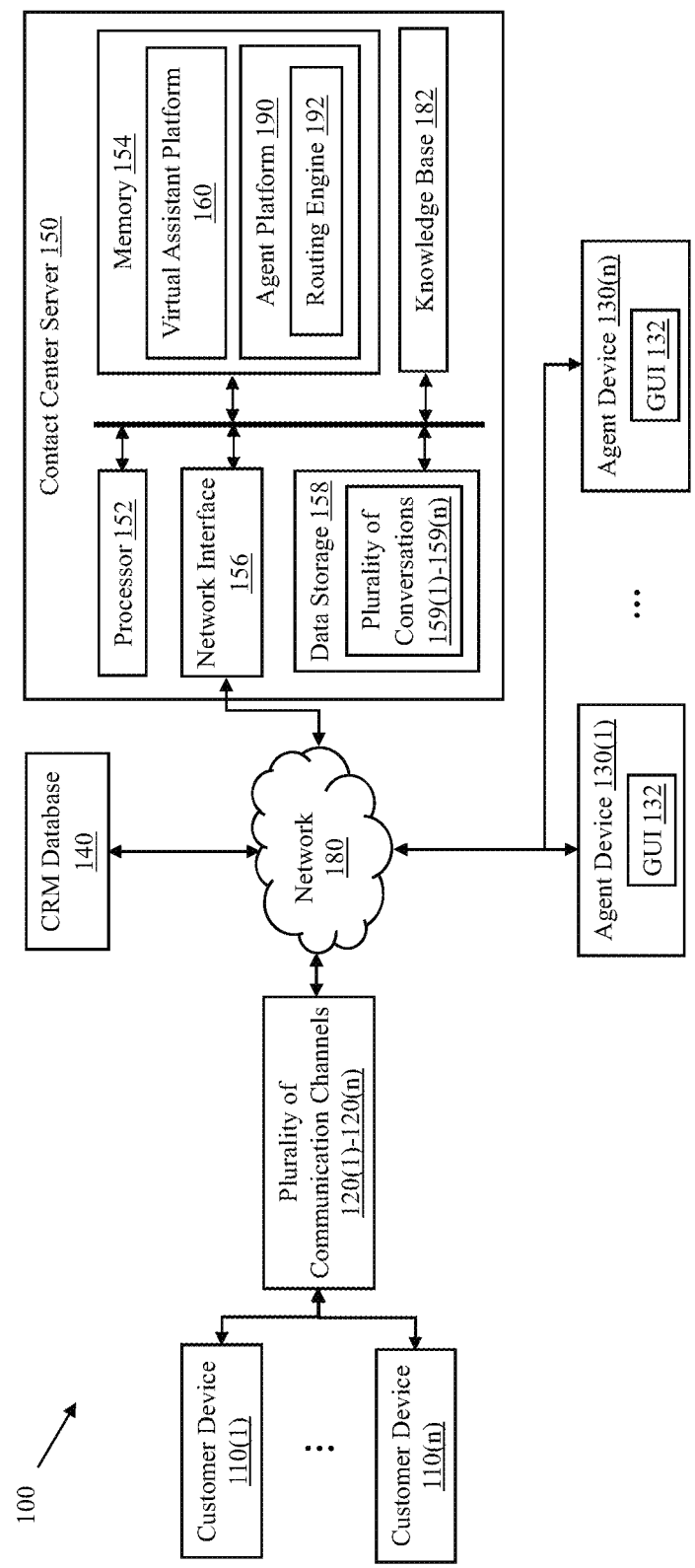
FIG. 1A is a block diagram of an exemplary environment with a contact center server configured to improve customer service by monitoring real-time conversations between customers and human agents and providing automated assistance to the human agents.

Referring to FIG. 1A, a block diagram of an exemplary environment 100 with the contact center server 150 configured to improve customer service by monitoring real-time conversations between customers at a plurality of customer devices 110(1)-110(n) and human agents at a plurality of agent devices 130(1)-130(n) and providing automated assistance to the human agents at the plurality of agent devices 130(1)-130(n). The environment 100 includes: the plurality of customer devices 110(1)-110(n), a plurality of communication channels 120(1)-120(n), the plurality of agent devices 130(1)-130(n), a customer relationship management (CRM) database 140, and the contact center server 150, all coupled together via a network 180, although the environment 100 can include other types and numbers of systems, devices, components, and/or elements and in other topologies and deployments. Although not illustrated, the environment 100 may include additional network components, such as routers, switches, and other devices by way of example only, which are well known to those of ordinary skill in the art and thus will not be described here.

The contact center server 150 handles customer requests from one or more of the plurality of customer devices 110(1)-110(n) reaching the contact center server 150 via voice and digital channels. The contact center server 150 may use automation and artificial intelligence (e.g., virtual assistants), the human agents, or a combination of the virtual assistants and the human agents to address the customer requests. In one example, a customer request from one of the plurality of customer devices 110(1)-110(n) is directly transferred to a human agent at one of the plurality of agent devices 130(1)-130(n). In another example, the customer request from one of the plurality of customer devices 110(1)-110(n) is initially handled by the contact center server 150 and subsequently transferred to the human agent at one of the plurality of agent devices 130(1)-130(n) when intervention of the human agent is required.

The contact center server 150 includes a processor 152, a memory 154, a network interface 156, a data storage 158, and a knowledge base 182 although the contact center server 150 may include other types and/or numbers of components in other configurations. In addition, the contact center server 150 may include an operating system (not shown). In one example, the contact center server 150 and/or processes performed by the contact center server 150 are implemented using a networking environment (e.g., cloud computing environment). In another example, the contact center server 150 is offered as a service by the cloud computing environment.

The components of the contact center server 150 may be coupled to each other by a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, a Small Computer Systems Interface (SCSI) bus, or a combination of two or more of these.

The processor 152 of the contact center server 150 may execute one or more computer-executable instructions stored in the memory 154 to implement the methods illustrated and described with reference to the examples herein, although the processor can execute other types and numbers of instructions and perform other types and numbers of operations. The processor 152 may comprise one or more central processing units (CPUs), or general-purpose processors with a plurality of processing cores, such as Intel® processor(s), AMD® processor(s), although other types of processor(s) could be used in other configurations. Although the contact center server 150 may comprise a plurality of processors, a single processor 152 is illustrated in FIG. 1A for simplicity.

The memory 154 of the contact center server 150 is an example of a non-transitory computer readable storage medium capable of storing information or instructions for the processor 152 to operate on as illustrated and described by way of the examples herein. The instructions, which when executed by the processor 152, perform one or more of the disclosed examples. In one example, the memory 154 is a random access memory (RAM), a dynamic random access memory (DRAM), a static random access memory (SRAM), a persistent memory (PMEM), a nonvolatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. It may be understood that the memory 154 may include other electronic, magnetic, optical, electromagnetic, infrared or semiconductor based non-transitory computer readable storage medium which may be used to tangibly store instructions, which when executed by the processor 152, perform the disclosed examples. The non-transitory computer readable storage medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1A, the memory 154 may include instructions corresponding to a virtual assistant platform 160 and an agent platform 190 of the contact center server 150, although other types and/or numbers of instructions in the form of programs, functions, methods, procedures, definitions, subroutines, or modules may be stored. The contact center server 150 receives communications from one or more of the plurality of customer devices 110(1)-110(n) and uses the virtual assistant platform 160, the agent platform 190, or a combination of the virtual assistant platform 160 and the agent platform 190 to provide responses to the received communications. Further, the virtual assistant platform 160 and the agent platform 190 may be connected to each other using a middleware.

The network interface 156 may include hardware, software, or a combination of hardware and software, enabling the contact center server 150 to communicate with the components illustrated in the environment 100, although the network interface 156 may enable communication with other types and/or number of components in other configurations. In one example, the network interface 156 provides interfaces between the contact center server 150 and the network 180. The network interface 156 may support wired or wireless communication. In one example, the network interface 156 includes an Ethernet adapter or a wireless network adapter to communicate with the network 180.

The plurality of customer devices 110(1)-110(n) may communicate with the contact center server 150 via the network 180. The customers at the plurality of customer devices 110(1)-110(n) may access and interact with the functionalities exposed by the contact center server 150 via the network 180. The plurality of customer devices 110(1)-110(n) may include any type of computing device that can facilitate customer interaction, for example, a desktop computer, a laptop computer, a tablet computer, a smartphone, a mobile phone, a wearable computing device, or any other type of device with communication and data exchange capabilities. The plurality of customer devices 110(1)-110(n) may include software and hardware capable of communicating with the contact center server 150 via the network 180. Also, the plurality of customer devices 110(1)-110(n) may render and display the information received from the contact center server 150. The plurality of customer devices 110(1)-110(n) may render an interface of one or more of the plurality of communication channels 120(1)-120(n) which the customers may use to communicate with the contact center server 150.

The customers at the plurality of customer devices 110(1)-110(n) may communicate with the contact center server 150 via the network 180 by providing text input, voice input, or a combination of text input and voice input via one or more of the plurality of communication channels 120(1)-120(n). The plurality of communication channels 120(1)-120(n) may include channels such as, enterprise messengers (e.g., Skype for Business, Microsoft Teams, Kore.ai Messenger, Slack, Google Hangouts, or the like), social messengers (e.g., Facebook Messenger, WhatsApp Business Messaging, Twitter, Lines, Telegram, or the like), web & mobile channels (e.g., a web application, a mobile application), interactive voice response (IVR) channels, voice channels (e.g., Google Assistant, Amazon Alexa, or the like), live chat channels (e.g., LivePerson, LiveChat, Zendesk Chat, Zoho Desk, or the like), a webhook channel, a short messaging service (SMS), email, a software-as-a-service (SaaS) application, voice over internet protocol (VoW) calls, computer telephony calls, or the like. It may be understood that to support voice-based communication channels, the environment 100 may include, for example, a public switched telephone network (PSTN), a voice server, a text-to-speech (TTS) engine, and/or an automatic speech recognition (ASR) engine.

The human agents at the plurality of agent devices 130(1)-130(n) may interact with the contact center server 150, the CRM database 140, and/or the plurality of customer devices 110(1)-110(n) via the network 180. In one example, the human agents at the plurality of agent devices 130(1)-130(n) may access the data storage 158 and the CRM database 140 via one or more application programming interfaces (APIs), one or more hyperlinks, or one or more uniform resource locators (URLs) by way of example. The plurality of agent devices 130(1)-130(n) may be, a desktop computer, a laptop computer, a tablet computer, a smartphone, a mobile phone, or any other type of device with communication and data exchange capabilities. The plurality of agent devices 130(1)-130(n) may include one or more communication devices (not shown) through which the human agents may communicate with the customers at the plurality of customer devices 110(1)-110(n) over a cellular, a mobile, and/or a telephone network. Also, the plurality of agent devices 130(1)-130(n) comprise a graphical user interface (GUI) 132 that may render, and display data received from the contact center server 150 and the plurality of customer devices 110(1)-110(n). The plurality of agent devices 130(1)-130(n) may run applications such as web browsers or a contact center software, which may render the GUI 132, although other applications may render the GUI 132.

The plurality of customer devices 110(1)-110(n) and the plurality of agent devices 130(1)-130(n) may include components, such as, one or more processors, one or more memories, one or more input devices such as a keyboard, a mouse, a display device, a touch interface, and one or more communication interfaces, which may be coupled together by a data communication bus or other link, although each of the plurality of customer devices 110(1)-110(n) and the plurality of agent devices 130(1)-130(n) may have other types and/or numbers of other systems, devices, components, and/or other elements.

The network 180 enables the plurality of customer devices 110(1)-110(n), the plurality of agent devices 130(1)-130(n), the CRM database 140, or other such devices to communicate with the contact center server 150 or one another. The network 180 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 180 may include other types and/or numbers of networks in other topologies or configurations.

The network 180 may support protocols such as, Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VoIP), although other types and/or numbers of protocols may be supported in other topologies or configurations. The network 180 may also support standards or formats such as, for example, hypertext markup language (HTML), extensible markup language (XML), voiceXML, call control extensible markup language (CCXML), JavaScript object notation (JSON), although other types and/or numbers of data, media, and document standards and formats may be supported in other topologies or configurations. The network interface 156 of the contact center server 150 may include any interface that is suitable to connect with any of the above-mentioned network types and communicate using any of the above-mentioned network protocols, standards, or formats.

The CRM database 140 may store the customers information, such as, profile details (e.g., name, address, phone numbers, gender, age, and occupation), communication channel preferences (e.g., text chat, SMS, voice chat, multimedia chat, social networking chat, web, and telephone call), language preferences, membership information (e.g., membership ID, and membership category), transaction data (e.g., communication session details such as: date, time, call handle time, or the like), or past interactions data (such as sentiment, emotional state, call deflection, feedback, service ratings, or the like), although the CRM database 140 may store other types and numbers of customer information in other configurations. The CRM database 140 may be updated dynamically in real-time or periodically based on the conversations of the customers with the contact center server 150 or the human agents at the plurality of agent devices 130(1)-130(n). Although depicted as an external component in FIG. 1A, in one example, the CRM database 140 may be a part of the contact center server 150.

The data storage 158 of the contact center server 150 may store conversation data for a plurality of conversations 159(1)-159(n) of the customers handled by the contact center server 150 or the human agents at the plurality of agent devices 130(1)-130(n). The conversation data for each of the plurality of conversations 159(1)-159(n) comprises a transcript of the conversation, where each of the plurality of conversations 159(1)-159(n) may be a text-based, a voice-based, or a combination of text-based and voice-based conversation. Although not shown, the data storage 158 may also store audio recordings of the voice-based conversations of the plurality of conversations 159(1)-159(n) that are handled by the contact center server 150 or the human agents at the plurality of agent devices 130(1)-130(n). The data storage 158 may also store metadata associated with each of the plurality of conversations 159(1)-159(n), such as: session identifier (session ID), conversation ID, customer information (such as name, identifier, address, contact details, or the like), human agent information (such as name, identifier, or the like), timestamp information, customer sentiment, disposition code(s), conversation summary, message tags, annotation data, or the like. The data storage 158 may be updated dynamically in real-time with the conversation data for the plurality of conversations 159(1)-159(n), audio recordings, and/or metadata associated with the plurality of conversations 159(1)-159(n). In one example, the conversation data for each of the plurality of conversations 159(1)-159(n) may comprise the metadata of the conversation.

Further, one or more enterprise users such as administrators, managers, supervisors, developers, or the like may use at least one of: the conversation data for the plurality of conversations 159(1)-159(n), the audio recordings, or the metadata associated with each of the plurality of conversations 159(1)-159(n) to, for example, understand the behavior of the customers, understand most common issues faced by the customers, look for customer issues that can be automated, review performance of virtual assistants that interact with the customers, review behavior and performance of the human agents who handle the plurality of conversations 159(1)-159(n), perform other contact center analytics, or the like. In one example, the one or more enterprise users may review and annotate one or more of the plurality of conversations 159(1)-159(n) in the conversation data, which will be stored as part of the metadata in the data storage 158.

The knowledge base 182 of the contact center server 150 may be a product-specific database, domain-specific database, or a combination of the product-specific database and the domain-specific database that includes information about products and services in the form of, for example, frequently asked questions (FAQs), documents (e.g., articles, books, magazines), online content, hyperlinks, audio-video data, or graphical data that may be organized as relational data, tabular data, knowledge graph, or the like. The knowledge base 182 may be accessed by the human agents at the plurality of agent devices 130(1)-130(n), the virtual assistant platform 160, or the agent platform 190 to address the customer requests. The human agents at the plurality of agent devices 130(1)-130(n) may search the knowledge base 182, for example, using the GUI 132, although other manners for interacting with the knowledge base 182 may be used. The knowledge base 182 may be dynamically updated. The knowledge base 182 may comprise different databases, some of which may be internal or external to the contact center server 150. Although there may be multiple databases, a single knowledge base 182 is illustrated in FIG. 1A for simplicity.

The agent platform 190 of the contact center server 150 facilitates communication between the contact center server 150 and the plurality of agent devices 130(1)-130(n). The agent platform 190 includes a routing engine 192 which handles routing the plurality of conversations to the plurality of agent devices 130(1)-130(n), although the agent platform 190 may include other types and/or numbers of components in other configurations. In one example, the routing engine 192 manages transferring a conversation handled by one of the plurality of virtual assistants to one or more of the plurality of agent devices 130(1)-130(n). In another example, messages from the virtual assistant platform 160 are output to one or more of the plurality of agent devices 130(1)-130(n) via the agent platform 190. The routing engine 192 may be configured with artificial intelligence including one or more predictive models, rules, one or more programming modules, or one or more routing algorithms that are executable by the processor 152 to route the plurality of conversations to the human agents at the plurality of agent devices 130(1)-130(n).

Figure 1B:
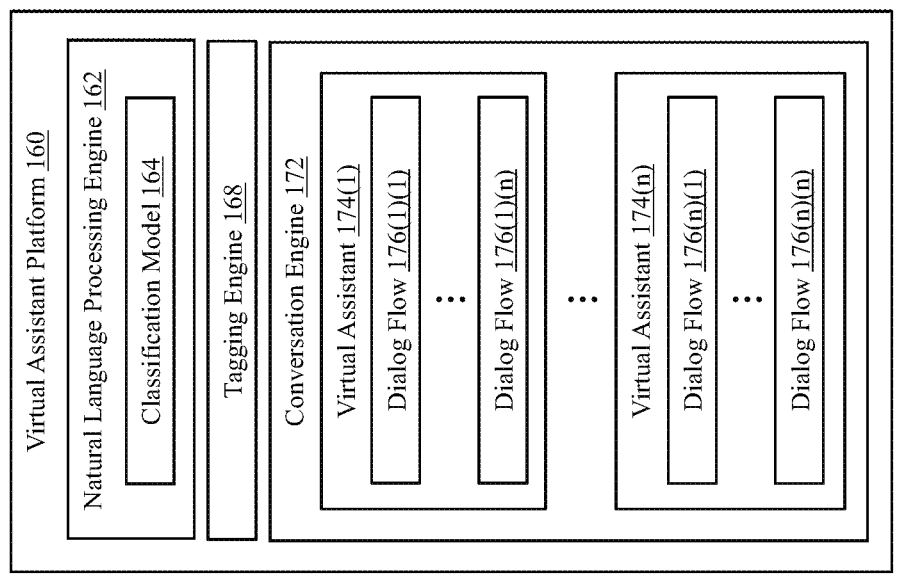
FIG. 1B is a block diagram of the virtual assistant platform of the contact center server illustrated in FIG. 1A.

FIG. 1B is a block diagram of the virtual assistant platform 160 of the contact center server 150 illustrated in FIG. 1A. As illustrated in FIG. 1B, the virtual assistant platform 160 hosts a natural language processing (NLP) engine 162, a tagging engine 168, and a conversation engine 172, although the virtual assistant platform 160 may include other types and/or numbers of components in other configurations.

As illustrated in FIG. 1B, the NLP engine 162 comprises a classification model 164, although the NLP engine 162 may comprise other classification models or algorithms in other configurations. The classification model 164 is used to determine if there are one or more changes between a message pair comprising an agent-assist response recommendation (hereinafter referred to as "automated response recommendation") and an agent response. In one example, the one or more changes comprise a confirmation message, an additional message, a new intent, or a new entity, although other types and numbers of other changes may be considered. In one example, the classification model 164 is a neural network model (e.g., feed-forward, recurrent, convolutional, and modular), or a machine learning (ML) model (supervised, semi-supervised, or unsupervised).

The classification model 164 is trained using a plurality of annotated message pairs, where each of the plurality of annotated message pairs comprises an automated response recommendation, an agent response, and an expected output. FIG. 2 is a table of exemplary annotated message pairs that may be used for training the classification model 164, although other types of annotated message pairs or training data may be used in other configurations to train the classification model 164. In one example, each of the plurality of annotated message pairs are manually entered by the one or more enterprise users using a graphical user interface presented by the contact center server 150. In another example, the one or more enterprise users provide the plurality of annotated message pairs in the form of, such as, a json file, a csv file, or an xlsx file, although the plurality of annotated message pairs may be provided in other formats in other configurations. The example annotated message pairs of FIG. 2 are illustrated in tabular form for simplicity.

Further, during a conversation between a customer at a customer device 110(1) and a human agent at an agent device 130(1), the contact center server 150 feeds one or more customer messages received from the customer device 110(1) as part of conversation data of the conversation to the virtual assistant platform 160. The NLP engine 162 of the virtual assistant platform 160 interprets the one or more customer messages and identifies one or more intents of the customer messages and extracts one or more entities from the one or more customer messages. In one example, the NLP engine 162 uses machine learning techniques, classification models, semantic rules, component relationships, business rules, named entity recognition (NER), or the like to identify the one or more intents and extract the one or more entities from the one or more customer messages. Further, the virtual assistant platform 160 executes one or more of a plurality of dialog flows 176(1)(1)-176(1)(n): 176(n)(1)-176(n)(n) of the one or more intents identified by the NLP engine 162 and provides recommendation data 316 to the human agent at the agent device 130(1), which may be sent by the human agent at the agent device 130(1) to the customer device 110(1) as one or more agent responses to the one or more customer messages.

In one example, the virtual assistant platform 160 by executing the one or more of the plurality of dialog flows 176(1)(1)-176(1)(n):176(n)(1)-176(n)(n), assists the human agent at the agent device 130(1) to handle the conversation with the customer at the customer device 110(1) by providing data such as, one or more automated response recommendations (e.g., one or more message prompts, or one or more content snippets extracted from one or more knowledge articles), one or more next best actions (e.g., buttons to trigger API calls, launch applications, or trigger robotic process automation (RPA) processes), one or more knowledge articles, hyperlinks to the one or more knowledge articles, or other relevant information based on at least one of: one or more intents identified, current message of the customer, one or more previous messages of the customer, sentiment of the customer, and a context of the conversation.

An intent may be defined as a purpose of the customer at the customer device 110(1). The intent may be identified from the one or more customer messages received from the customer device 110(1) and fulfilled by the contact center server 150 using one or more of a plurality of virtual assistants 174(1)-174(n), one or more human agents at one or more of the plurality of agent devices 130(1)-130(n), or a combination of the one or more of the plurality of virtual assistants 174(1)-174(n) and the one or more human agents at the one or more of the plurality of agent devices 130(1)-130(n). Example intents include book flight, book train, book cab, restaurant search, check balance, transfer funds, search document, diagnose network, diagnose device, reset device, or the like, by way of example. To fulfill the customer's intent, the contact center server 150 uses one or more entities defined, in the one or more dialog flows, by entity parameters including: an entity name, an entity type, or an entity value, although there may be other types and/or numbers of entity parameters in other configurations. In one example, the entity type includes airport, address, city, company name, color, currency, product category, date, time, location, place name, or the like. For example, in a customer message—"book flight ticket from San Diego to New York", the intent of the customer is "book flight", and "San Diego" and "New York" are the entity values whose entity type is "city".

The conversation engine 172 of the virtual assistant platform 160 orchestrates the conversations between the customers at the one or more of the plurality of customer devices 110(1)-110(n) and the human agents at the one or more of the plurality of agent devices 130(1)-130(n) by executing the one or more of the plurality of dialog flows 176(1)(1)-176(1)(n):176(n)(1)-176(n)(n) configured for the one or more of a plurality of virtual assistants 174(1)-174(n). Further, the conversation engine 172 manages the context of the conversation between the customer at the customer device 110(1) and the human agent at the agent device 130(1).

The conversation engine 172 may be implemented, for example, as a finite state machine that uses states and state information to orchestrate the conversations between the customers at the plurality of customer devices 110(1)-110(n) and the human agents at the plurality of agent devices 130(1)-130(n), although the conversation engine 172 may be implemented in other ways and/or configurations. The conversation engine 172 may also comprise configurations of the plurality of virtual assistants 174(1)-174(n) and decision trees corresponding to the one or more of the plurality of virtual assistants 174(1)-174(n). Further, the conversation engine 172 may manage digressions or interruptions from the customers at the one or more of the plurality of customer devices 110(1)-110(n) during the conversations with the human agents at the one or more of the plurality of agent devices 130(1)-130(n).

Each of the plurality of virtual assistants 174(1)-174(n) may include one or more rules, one or more dialog flows, one or more neural networks, or one or more artificial intelligence-based configurations, models, or instructions. For example, as illustrated in FIG. 1B, a virtual assistant 174(1) includes one or more associated dialog flows 176(1)(1)-176(1)(n) of one or more intents configured for the virtual assistant 174(1) and a virtual assistant 174(n) includes one or more associated dialog flows 176(n)(1)-176(n)(n) of one or more intents configured for the virtual assistant 174(n). In one example, the virtual assistant platform 160 executes the one or more of the plurality of dialog flows 176(1)(1)-176(1)(n): 176(n)(1)-176(n)(n) associated to the plurality of virtual assistants 174(1)-174(n) to assist the human agents at the plurality of agent devices 130(1)-130(n) during the conversations with the customers at the one or more of the plurality of customer devices 110(1)-110(n). For example, the enterprise user creates a dialog flow for each intent configured for the plurality of virtual assistants 174(1)-174(n). The dialog flow of each intent may comprise a network of nodes connected that define a sequence of steps to be executed to fulfil the intent of the customer at the customer device 110(1). The network of nodes of the dialog flow may comprise: an intent node, one or more entity nodes, one or more confirmation nodes, one or more service nodes, or one or more message nodes, although network of nodes of the dialog flow may comprise other types and/or numbers of nodes in other orders and/or configurations.

The tagging engine 168 associates one or more tags to one or more messages exchanged as part of the conversation by the customer at the customer device 110(1) or the human agent at the agent device 130(1) based on at least one of: message content, the context of the conversation, or the output of the classification model 164. The one or more tags may include new intent—<intent name>, new entity, confirmation message, additional message, or the like, although other types and/or numbers of tags may be used. In one example, the tagging engine 168 will not associate any tag(s) to one or more messages of the conversation. The tagging engine 168 may be configured as a rule-based engine. In one example, for each conversation in the plurality of conversations 159(1)-159(n) the corresponding associated one or more tags are stored as part of metadata of the conversation by way of an example. The conversation engine 172 or the tagging engine 168 may create and manage metadata of each conversation of the plurality of conversations 159(1)-159(n) in conversation data, although other types and/or numbers of components in the virtual assistant platform 160 may create and manage the metadata.

Figure 3:
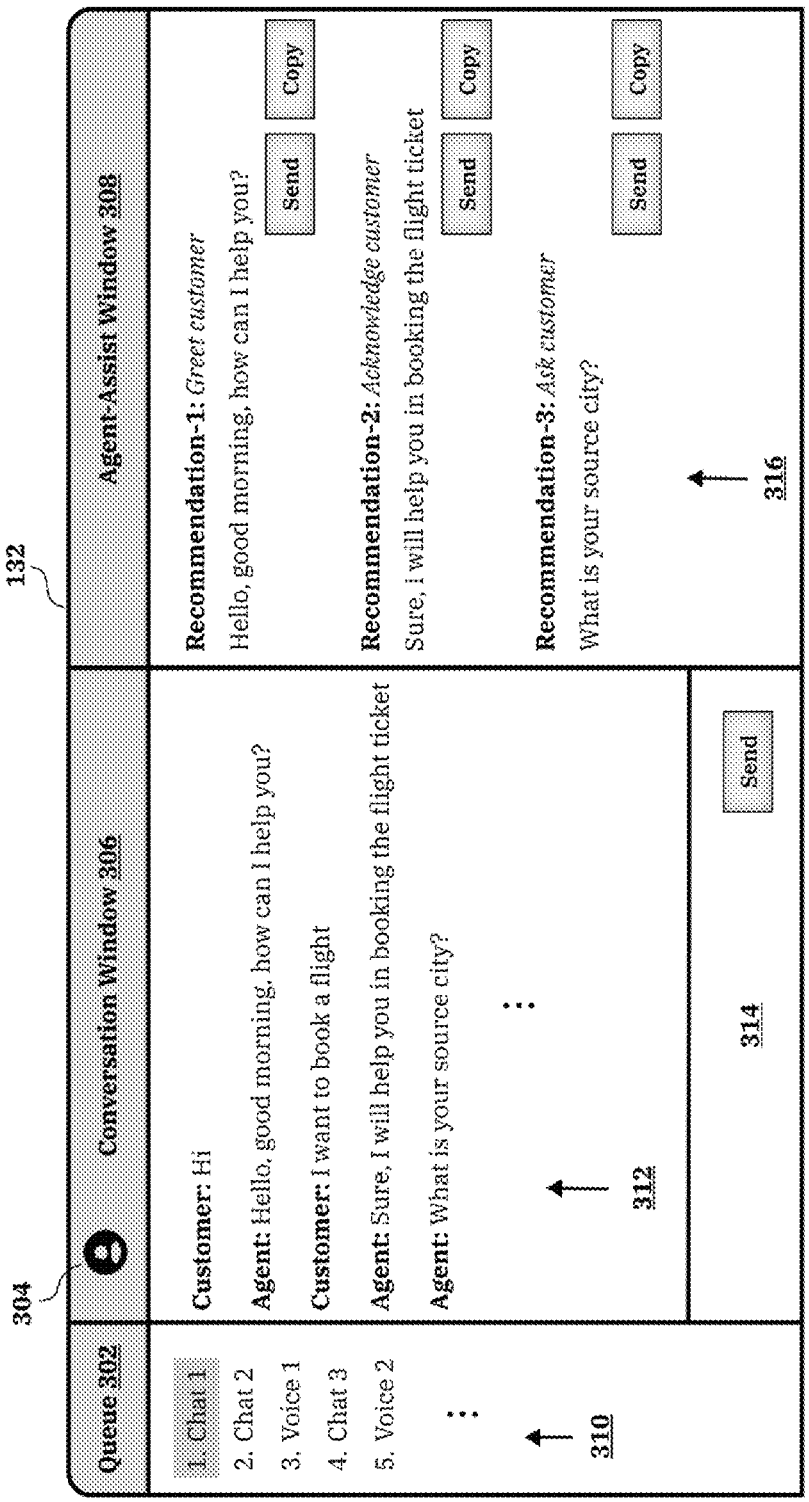
FIG. 3 is an example wireframe of a graphical user interface that is displayed to a human agent at an agent device.

Referring to FIG. 3, an example wireframe of a graphical user interface (GUI) 132 provided by the contact center server 150 to the human agents at the plurality of agent devices 130(1)-130(n) is illustrated. The GUI 132 may be displayed using a contact center software executable on the plurality of agent devices 130(1)-130(n), or a web page provided by the contact center server 150 and rendered in a browser executable on the plurality of agent devices 130(1)-130(n), although the GUI 132 may be displayed by other types and/or numbers of applications in other configurations. The contact center software or the web page provided by the contact center server 150 enables the human agents at the plurality of agent devices 130(1)-130(n) to communicate with the customers at the plurality of customer devices 110(1)-110(n), view information related to the customers or customer conversations, view the recommendation data 316 provided by the virtual assistant platform 160, search and retrieve information from data sources (e.g., the CRM database 140, the data storage 158, or the knowledge base 182), communicate with third-party applications or databases, or the like. Further, the contact center software or the web page provided by the contact center server 150 at the plurality of agent devices 130(1)-130(n) allows the contact center server 150 to record conversations between the customers at the plurality of customer devices 110(1)-110(n) and the human agents at the plurality of agent devices 130(1)-130(n) and monitor performance of the human agents at the one or more of the plurality of agent devices 130(1)-130(n).

As illustrated in FIG. 3, the GUI 132 may include a queue window 302, a conversation window 306, and an agent-assist window 308, although other types and/or numbers of windows, panels, or widgets may be included in the GUI 132 in other configurations. The queue window 302 shows a list of conversations 310 (e.g., chat 1, chat 2, voice 1, chat 3, and voice 2) that are transferred to the human agent at the agent device 130(1) by the routing engine 192.

The conversation window 306 may include a profile icon 304, a conversation transcript area 312, and a compose bar 314 for the human agent at the agent device 130(1) to compose and send an agent response to the customer at the customer device 110(1) during the conversation. The human agent at the agent device 130(1) may access the customer profile by clicking on the profile icon 304. In the conversation transcript area 312, the conversation data exchanged as part of the conversation between the human agent at the agent device 130(1) and the customer at the customer device 110(1) is displayed to the human agent at the agent device 130(1) by the contact center server 150. In the conversation transcript area 312, the conversation data corresponding to the conversation that is selected (e.g., chat 1 as illustrated in FIG. 3) from the list of conversations 310 by the human agent at the agent device 130(1) is displayed. In one example, the conversation that is selected (chat 1, in this example) from the list of conversations 310 by the human agent at the agent device 130(1) is highlighted as illustrated in FIG. 3, although the conversation that is selected by the human agent at the agent device 130(1) may be indicated in different ways such as, for example, a small pop-out view, changing the font color, using a status indicator, underlining, or the like.

Further, in the agent-assist window 308, the virtual assistant platform 160 provides the recommendation data 316 to the human agent at the agent device 130(1). For example, as illustrated in FIG. 3, one or more automated response recommendations (e.g., recommendation-1, recommendation-2, and recommendation-3) in recommendation data 316 are displayed to the human agent at the agent device 130(1) in the agent-assist window 308 by the virtual assistant platform 160. In one example, the one or more automated response recommendations in the recommendation data 316 are provided by the virtual assistant platform 160 based on at least one of: the context of the conversation, one or more intents of the customer, a sentiment of the customer, a stage in the conversation, current message of the customer in the conversation, or previous interactions of the customer with the contact center server 150, although the one or more automated response recommendations may be provided based on other types and/or number of parameters.

Further, as illustrated in FIG. 3, in the agent-assist window 308, for each of the one or more automated response recommendations in the recommendation data 316, a send option and a copy option are provided for selection by the human agent at the agent device 130(1). The send option and the copy option may be provided as clickable buttons, as illustrated in FIG. 3, although the send option and the copy option may be provided in other forms such as, radio buttons, check boxes, or any other user interface selectable controls.

In one example, when the human agent at the agent device 130(1) wants to use one of the one or more automated response recommendations in the recommendation data 316 (for example, recommendation-1) "as-is" to respond to the customer at the customer device 110(1), the human agent at the agent device 130(1) selects the send option corresponding to the recommendation-1, so that the recommendation-1 will be sent "as-is" as an agent response to the customer device 110(1).

In another example, the human agent at the agent device 130(1) selects the copy option corresponding to one of the one or more automated response recommendations in the recommendation data 316 (for example, recommendation-1) when the human agent at the agent device 130(1) wants to modify and use the recommendation-1 to respond to the customer at the customer device 110(1). In this example, when the copy option corresponding to the recommendation-1 is selected, the recommendation-1 will be presented in the compose bar 314 for editing by the human agent at the agent device 130(1). Subsequently, the human agent at the agent device 130(1) may modify (e.g., by rephrasing, by adding new content, or by deleting content) the recommendation-1 in the compose bar 314 and send the modified recommendation-1 to the customer at the customer device 110(1) as the agent response by either pressing an enter key on a keyboard connected to the agent device 130(1) or selecting a send button present in the compose bar 314 (illustrated in FIG. 3).

Here, the rephrasing of the recommendation-1 by the human agent at the agent device 130(1) may comprise at least one of: changing tone or grammar of the recommendation-1, by the human agent at the agent device 130(1). For example, if the recommendation-1 provided is "Book a flight from Washington DC to New York, is that correct?", the human agent at the agent device 130(1) may rephrase the recommendation-1 by changing tone as "Should I book a flight from Washington DC to New York?" Further, adding new content to the recommendation-1 by the human agent at the agent device 130(1) may comprise at least one of: adding one or more intents, adding one or more entities, adding one or more entity values, or adding empathy, although other content may be added by the human agent at the agent device 130(1) to the recommendation-1. Further, modifying content of the recommendation-1 by the human agent at the agent device 130(1) may comprise at least one of: modifying one or more intents, modifying one or more entities, or modifying one or more entity values, although other content may be modified by the human agent at the agent device 130(1) in the recommendation-1. Further, deleting content from the recommendation-1 by the human agent at the agent device 130(1) comprises at least one of: deleting one or more intents, deleting one or more entities, deleting one or more entity values, deleting empathy, or deleting any portion of the recommendation-1.

In another example, as part of the conversation data, the human agent at the agent device 130(1) does not use any of the one or more automated response recommendations in the recommendation data 316. Instead, the human agent at the agent device 130(1) composes an agent response manually in the compose bar 314 and sends the agent response to the customer at the customer device 110(1). In this example, the agent response manually composed by the human agent at the agent device 130(1) is a message such as, for example, a confirmation message, an additional message, an empathy, or the like, which does not correspond to any node of a dialog flow being executed by the virtual assistant platform 160 to assist the human agent at the agent device 130(1).

Figure 4:
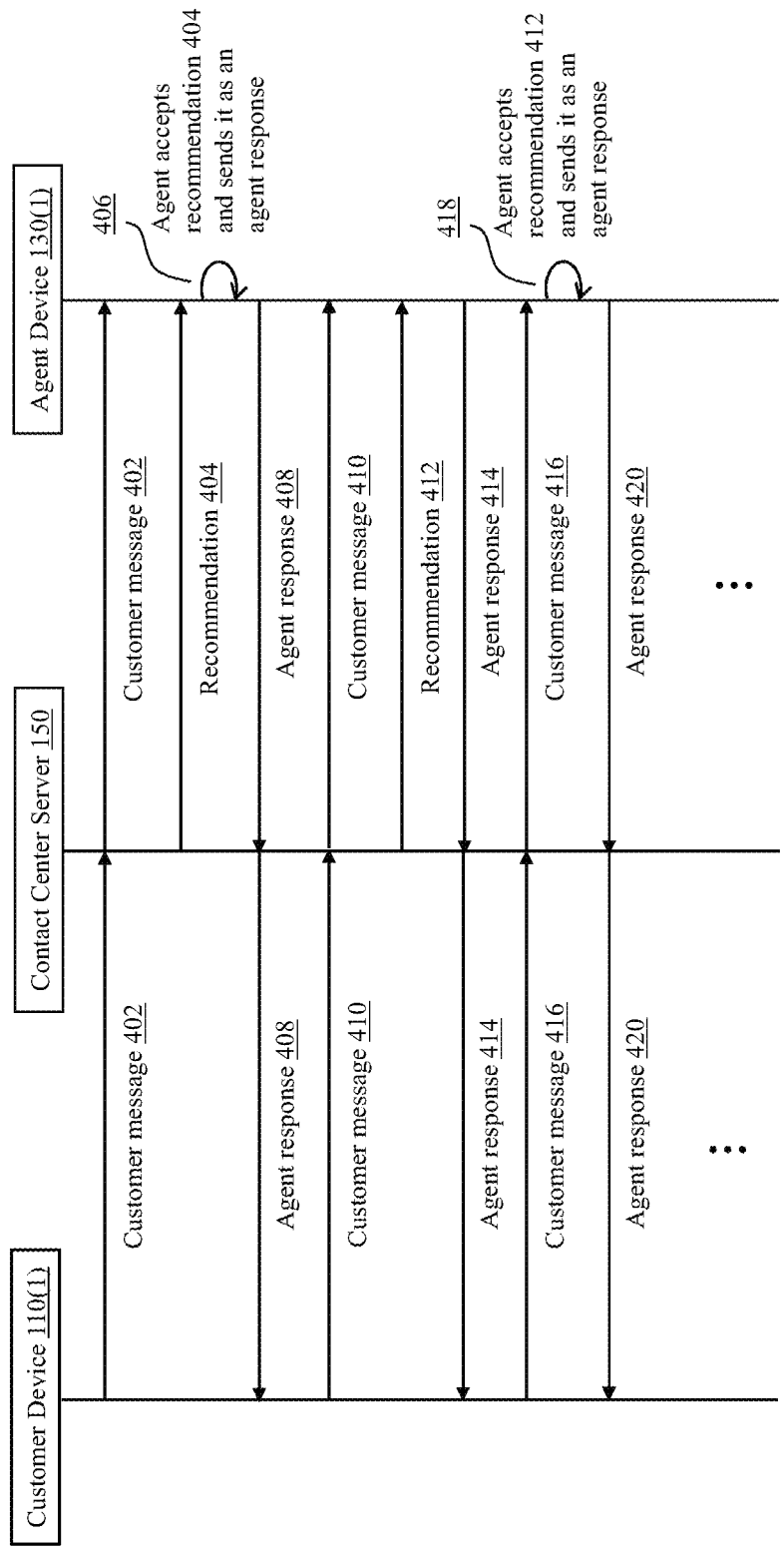
FIG. 4 is a sequence diagram illustrating an exemplary method for handling a customer conversation at the contact center server.

Referring to FIG. 4, a sequence diagram illustrating an exemplary method for handling a conversation at the contact center server 150. In one example, the conversation is a text-based conversation or a voice-based conversation. It may be understood that FIG. 4 depicts a few steps involved in the conversation between the customer at the customer device 110(1), the contact center server 150 and the human agent at the agent device 130(1), although other types and/or numbers of steps may be performed in other configurations. Further, it may be understood that the steps illustrated and described do not have to take place in the sequence illustrated.

In the illustrated exemplary sequence diagram in FIG. 4, the contact center server 150 receives a customer message 402 from the customer device 110(1) and sends the customer message 402 to the agent device 130(1) for display to the human agent in the conversation window 306 of the GUI 132. Further, the NLP engine 162 processes the customer message 402 to identify an intent of the customer and the virtual assistant platform 160 executes a dialog flow of the identified intent. Further, the virtual assistant platform 160, based on the customer message 402 and current execution stage of the dialog flow, determines a recommendation 404 and provides the recommendation 404 to the agent device 130(1) for display in the agent-assist window 308 of the GUI 132. At 406, from the agent-assist window 308, the human agent at the agent device 130(1) accepts the recommendation 404 "as-is" as an agent response 408. Further, the contact center server 150 receives the agent response 408 from the agent device 130(1) and sends the agent response 408 to the customer device 110(1).

Further, in the illustrated exemplary sequence diagram in FIG. 4, the contact center server 150 receives a customer message 410 from the customer device 110(1) and sends the customer message 410 to the agent device 130(1) for display to the human agent in the conversation window 306 of the GUI 132. Further, the virtual assistant platform 160, based on the customer message 410 and the current execution stage of the dialog flow, determines a recommendation 412 and sends the recommendation 412 to the agent device 130(1) for display to the human agent in the agent-assist window 308 of the GUI 132. In this example, the human agent at the agent device 130(1) instead of using the recommendation 412, manually composes an agent response 414. Further, the contact center server 150 receives the agent response 414 from the agent device 130(1) and sends the agent response 414 to the customer device 110(1). Here, in this example, by sending the agent response 414, the human agent at the agent device 130(1) seeks confirmation or gathers extra information from the customer at the customer device 110(1) that does not correspond to the dialog flow being executed by the virtual assistant platform 160.

Further, in the illustrated exemplary sequence diagram in FIG. 4, the contact center server 150 receives a customer message 416 from the customer device 110(1) and sends the customer message 416 to the agent device 130(1) for display to the human agent in the conversation window 306 of the GUI 132. In this example, the agent response 414 does not correspond to the dialog flow being executed and hence the virtual assistant platform 160 will not generate any recommendation corresponding to the customer message 416. At 418, from the agent-assist window 308, the human agent at the agent device 130(1) accepts the recommendation 412 "as-is" as an agent response 420. Further, the contact center server 150 receives the agent response 420 from the agent device 130(1) and sends the agent response 420 to the customer device 110(1).

Figure 5:
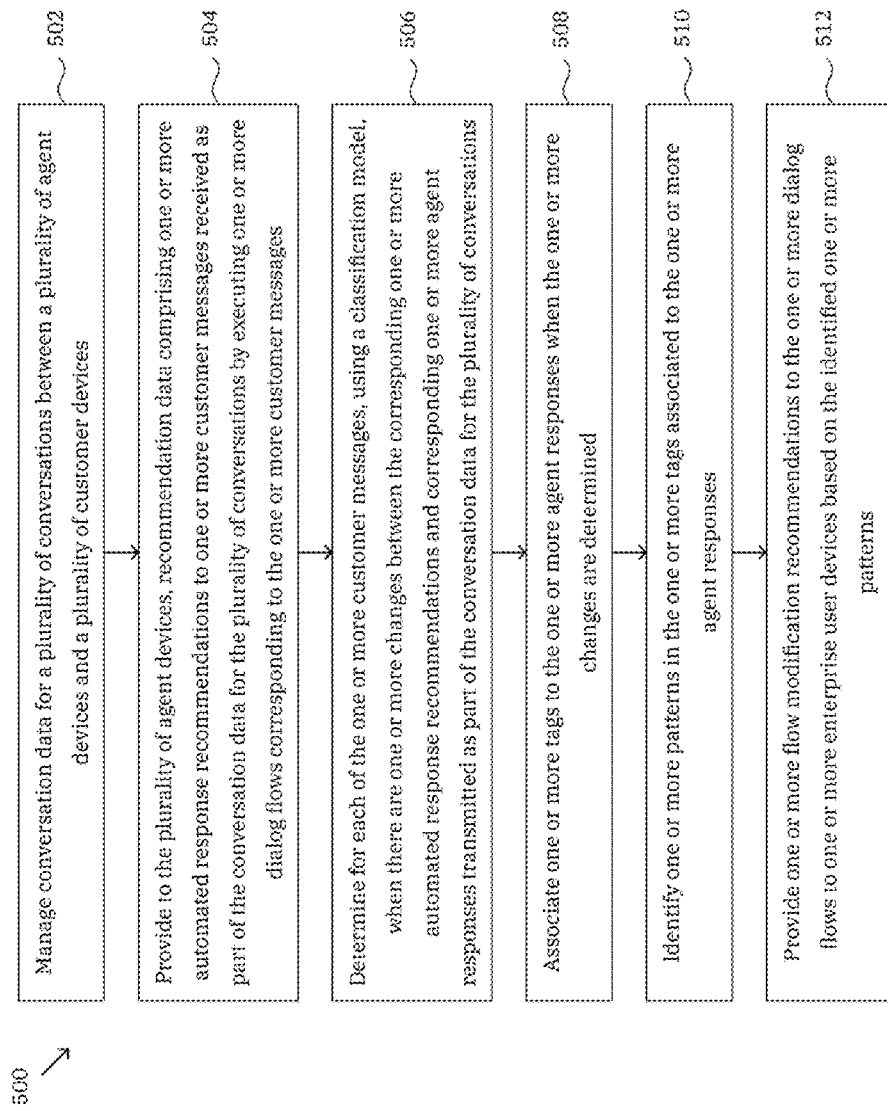
FIG. 5 is a flowchart of an exemplary method for tagging agent responses in conversation data for a plurality of conversations and recommending dialog flow modifications to an enterprise user at the contact center server.

Referring to FIG. 5, a flowchart of an exemplary method 500 implemented at the contact center server 150, for tagging agent responses in the plurality of conversations 159(1)-159(n) in the conversation data and recommending dialog flow modifications to an enterprise user device according to an example of the present disclosure is illustrated. The exemplary method 500 comprises the virtual assistant platform 160 which hosts and manages the plurality of virtual assistants 174(1)-174(n) and the plurality of dialog flows 176(1)(1)-176(1)(n):176(n)(1)-176(n)(n) associated to the plurality of virtual assistants 174(1)-174(n) to assist the one or more human agents at the one or more of the plurality of agent devices 130(1)-130(n) handle the conversations with one or more customers at the one or more of the plurality of customer devices 110(1)-110(n). The contact center 150 may interact with other components of the environment 100 to perform the steps of the exemplary method 500.

At step 502, the contact center server 150 manages the conversation data for the plurality of conversations 159(1)-159(n) between the one or more human agents at the one or more of the plurality of agent devices 130(1)-130(n) and the one or more customers at the one or more of the plurality of customer devices 110(1)-110(n). In one example, the conversation data for the plurality of conversations 159(1)-159(n) is managed by the virtual assistant platform 160 of the contact center server 150. The plurality of conversations 159(1)-159(n) comprises conversation data exchanged between the human agents at the one or more of the plurality of agent devices 130(1)-130(n) and the customers at the one or more of the plurality of customer devices 110(1)-110(n) in text mode, voice mode, or a combination of the text and the voice. Further, each conversation of the plurality of conversations 159(1)-159(n) may comprise one or more customer messages, one or more agent responses, the recommendation data 316, one or more tags associated to the one or more customer messages or the one or more agent responses, or other metadata of the conversation, although each conversation of the plurality of conversations 159(1)-159(n) may comprise other types and/or numbers of information related to the conversation.

At step 504, the contact center server 150 provides to the one or more of the plurality of agent devices 130(1)-130(n), the recommendation data 316 comprising the one or more automated response recommendations to the one or more customer messages received as part of the conversation data for the plurality of conversations 159(1)-159(n), by executing the one or more the plurality of dialog flows 176(1)(1)-176(1)(n):176(n)(1)-176(n)(n) corresponding to the one or more customer messages. The one or more automated response recommendations comprise at least one of: one or more message prompts configured in the one or more of the dialog flows 176(1)(1)-176(1)(n):176(n)(1)-176(n)(n) being executed, or one or more content snippets retrieved by executing web requests/API calls configured in the one or more of the dialog flows 176(1)(1)-176(1)(n):176(n)(1)-176(n)(n), although the one or more automated response recommendations may comprise other types and/or numbers of other recommendations.

For example, the NLP engine 162 receives the conversation data between the customer at the customer device 110(1) and the human agent at the agent device 130(1), and the NLP engine 162 processes the one or more customer messages received as part of the conversation data to identify one or more intents of the one or more customer messages. Further, the virtual assistant platform 160 of the contact center server 150 executes the one or more of the dialog flows 176(1)(1)-176(1)(n):176(n)(1)-176(n)(n) associated with the identified one or more intents. Furthermore, the contact center server 150 provides the determined one or more automated response recommendations for display to the human agent at the agent device 130(1) in the agent-assist window 308 of the GUI 132 (as illustrated in FIG. 3) in real-time during the conversation. As described above, for conversation data of each of the plurality of conversations 159(1)-159(n), the one or more automated response recommendations are determined and provided to the one or more of the plurality of agent devices 130(1)-130(n).

The context of the conversation may be defined as a memory of a conversation flow comprising message turns between the customer at the customer device 110(1) and the human agent at the agent device 130(1). The context of the conversation is tracked and maintained by the conversation engine 172. In one example, the context of the conversation is used to determine the meaning of each customer message or each agent response that is exchanged as part of the conversation. The sentiment of the customer may be defined as a metric that indicates customer feelings towards a brand or a service, which can be measured on a scale between positive and negative, or as an emotion (e.g., angry, sad, happy, or the like). The stage in the conversation may be one of: small-talk, greeting, information gathering and extracting (intent(s) and/or entities), resolution, or closing, although there may be other stages in the conversation that may be defined in other configurations.

Referring to FIG. 5, at step 506, the contact center server 150, for each of the one or more customer messages, determines using the classification model 164, when there are one or more changes between the corresponding one or more automated response recommendations and corresponding one or more agent responses transmitted as part of the conversation data for the plurality of conversations 159(1)-159(n). For example, the contact center server 150 inputs the corresponding one or more automated response recommendations and the corresponding one or more agent responses as a message pair to the classification model 164, to determine the one or more changes between the corresponding one or more automated response recommendations and the corresponding one or more agent responses, although other types and/or numbers of other models and combinations may be used. The classification model 164, based on the training provided by the enterprise user, analyzes the message pair and determines if there are one or more changes indicating at least one of: the human agent asking confirmation from the customer, the human agent sending an additional message (e.g., empathy, additional information) to the customer, or the human agent triggering another intent, a follow-up intent or a sub-intent, although the classification model 164 may determine other types of and/or numbers of other changes based on the training provided. For each message pair, the output of the classification model 164 may indicate either: "no change" or one or more changes between the one of the one or more automated response recommendations to the customer message and the corresponding agent response to the customer message.

In another example, the contact center server 150 determines the one or more changes between the corresponding one or more automated response recommendations and the corresponding one or more agent responses, by textual comparison. The textual comparison may be performed using techniques, such as, cosine similarity or string comparison, although other textual comparison techniques may be used. In another example, the contact center server 150 inputs the message pair to the classification model 164 to determine the one or more changes when a measured text similarity is below a threshold defined by the enterprise user.

Referring to FIG. 5, at step 508, the contact center server 150 associates one or more tags to the one or more agent responses when the one or more changes are determined at step 506. Here, the contact center server 150 uses the tagging engine 168 to associate the one or more tags to the one or more agent responses in the conversation data for the plurality of conversations 159(1)-159($n$). In one example, the tagging engine 168 associates the one or more tags to the one or more agent responses in the conversation data for the plurality of conversations 159(1)-159($n$) based on the output of the classification model 164. The one or more tags may comprise: confirmation message, additional message, new intent—<intent name>, new entity, used as-is (automated response recommendation used as-is), or the like, although other types and/or number of tags may be used.

At step 510, the contact center server 150 identifies one or more patterns in the one or more tags associated to the one or more agent responses in the conversation data for one or more of the plurality of conversations 159(1)-159($n$). In one example, the one or more patterns are identified when the one or more tags associated to the one or more agent responses in the conversation data for the plurality of conversations 159(1)-159($n$) occurs more than a predefined threshold number of times.

In one example, the contact center server 150 identifies the one or more patterns by grouping the conversation data for the plurality of conversations 159(1)-159($n$) into one or more conversation groups based at least on: an intent of each of the plurality of conversations 159(1)-159($n$); or an execution stage of the intent of each of the plurality of conversations 159(1)-159($n$) which outputs the one or more automated response recommendations that are not used or changed at the plurality of agent devices 130(1)-130($n$). In another example, the contact center server 150 identifies the one or more patterns by grouping the conversation data for the plurality of conversations 159(1)-159($n$) into one or more conversation groups based at least on: an intent of each of the plurality of conversations 159(1)-159($n$); or an execution stage of the intent of each of the plurality of conversations 159(1)-159($n$) at which the one or more of the plurality of agent responses are associated with the one or more tags based on the one or more changes determined (at step 506).

For example, in conversation data for a plurality of conversations 159(1)-159($n$) corresponding to an intent: "transfer funds", when a threshold number of the plurality of conversations 159(1)-159($n$) comprises an agent response associated with a tag—"confirmation message" (e.g., a confirmation message from the human agent asking the customer to confirm the transfer amount) after execution of an entity node (e.g., "what is the transfer amount?"), the one or more agent responses constituting the confirmation message is identified as a pattern in the conversation data for the plurality of conversations 159(1)-159($n$).

Subsequently, at step 512, the contact center server 150 automatically provides one or more flow modification recommendations to the one or more of the dialog flows 176(1)(1)-176(1)($n$):176($n$)(1)-176($n$)(n) to one or more enterprise users at one or more enterprise user devices (not shown) based on the identified one or more patterns. The one or more flow modification recommendations may comprise suggestions to: add, delete, or modify one or more nodes of the one or more of the dialog flows 176(1)(1)-176(1)($n$): 176($n$)(1)-176($n$)(n). In one example, the contact center server 150 sends the conversation data for the plurality of conversations 159(1)-159($n$) in which the one or more changes are determined along with the one or more flow modification recommendations to the one or more enterprise users at the one or more enterprise user devices. In this example, the one or more flow modification recommendations to the one or more enterprise users at the one or more enterprise user devices are sent in the form of an SMS, an email, an audio message, or a pop-up alert in the GUI of the one or more enterprise user devices, although other types and/or numbers of notification mechanisms may be used. Further, in this example, the one or more enterprise users at the one or more enterprise user devices review the one or more flow modification recommendations or the conversation data received along with the one or more flow modification recommendations and modify the one or more of the dialog flows 176(1)(1)-176(1)($n$):176($n$)(1)-176($n$)(n). In another example, the one or more flow modification recommendations comprise suggestions to: add one or more new nodes between two or more nodes of the one or more of the dialog flows 176(1)(1)-176(1)($n$):176($n$)(1)-176($n$)(n); delete one or more nodes of the one or more of the dialog flows 176(1)(1)-176(1)($n$):176($n$)(1)-176($n$)(n); or modify one or more nodes of the one or more of the dialog flows 176(1)(1)-176(1)($n$):176($n$)(1)-176($n$)(n).

In another example, based on the conversation data for the plurality of conversations 159(1)-159($n$) in which the one or more changes are determined and the one or more patterns are identified, the contact center server 150 automatically generates a modified version of each of the one or more of the dialog flows 176(1)(1)-176(1)($n$):176($n$)(1)-176($n$)(n) and provides the modified version of each of the one or more of the dialog flows 176(1)(1)-176(1)($n$):176($n$)(1)-176($n$)(n) to the one or more enterprise users at the one or more enterprise user devices. In this example, the modified version of each of the one or more of the dialog flows 176(1)(1)-176(1)($n$):176($n$)(1)-176($n$)(n) are provided to the one or more enterprise users at the one or more enterprise user devices in the form of, for example, an image, a PDF, a JavaScript object notation (JSON) file, an interactive object, or any other format supported by the virtual assistant platform 160. Further, in this example, the one or more flow modification recommendations comprise selectable options, such as, approve, reject, or review later, although other types and number of options may be included in the one or more flow modification recommendations for selection by the enterprise user. The selectable options may be provided in the form of clickable buttons, radio buttons, check boxes, or any other user interface selectable controls. The one or more enterprise users at the one or more enterprise user devices may approve (or reject) the modified version of each of the one or more of the dialog flows 176(1)(1)-176(1)($n$): 176($n$)(1)-176($n$)(n) by selecting the approve option (or reject option). For example, after an enterprise user approves a flow modification recommendation comprising a modified version of a dialog flow 176(1)(1) associated to the virtual assistant 174(1) managed by the virtual assistant platform

160, the contact center server 150 automatically replaces an original version of the dialog flow 176(1)(1) with the modified version of the dialog flow 176(1)(1) on the virtual assistant platform 160. In this example, an enterprise user device is operated by, for example, a developer, a system admin, or a contact center supervisor, although the enterprise user device may be operated by any other enterprise user. Further, in this example, there may be other types and number of steps performed in other orders and/or configurations.

The methods, systems, and examples described above significantly reduce the amount of time required by the one or more enterprise users to manually review the conversation data for each of the plurality of conversations 159(1)-159(n) and update the dialog flows. Further, updating the dialog flows based on the human agent actions during the conversations with the customers in turn improves assistance to the human agents by providing better recommendation data, which in turn helps the human agents to address the customer requests quickly and efficiently.

Figure 6B:
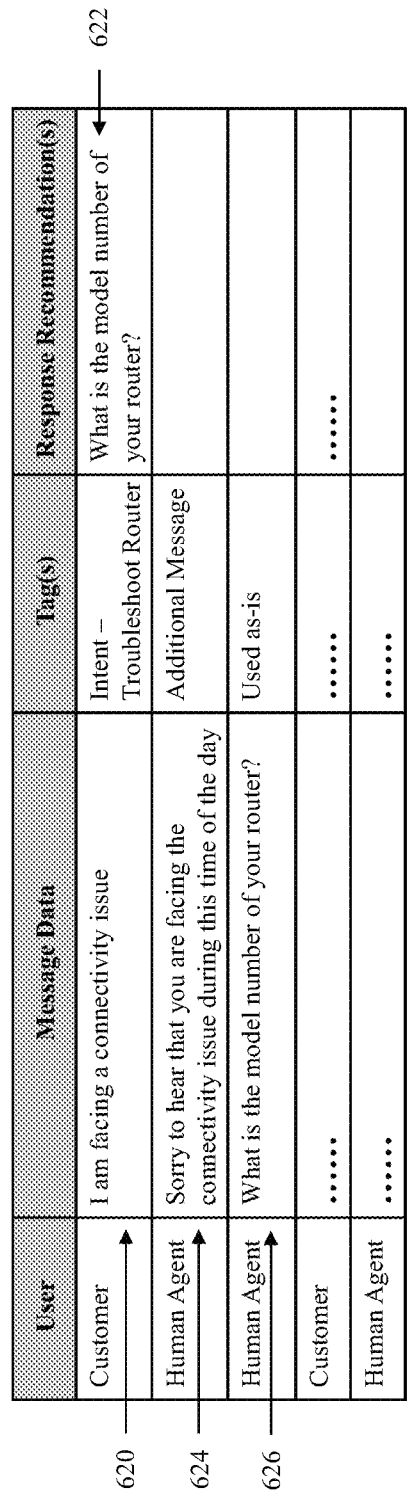

Referring to FIGS. 6A-6C, exemplary tables of conversation data between, in this example, the customer at the customer device 110(1) and the human agent at the agent device 130(1), one or more tags associated to messages of the conversation data, and the automated response recommendations provided to the human agent at the agent device 130(1) are illustrated. The examples in FIGS. 6A-6C are illustrated in tabular form for simplicity, although the conversation data, the one or more tags associated to the messages of the conversation data, and the automated response recommendations provided to the human agent at the agent device 130(1) may be stored in the form of JSON files, txt files, csv files, relational data tables, or the like.

Referring to FIG. 6A, a table of an exemplary conversation data between the human agent at the agent device 130(1) and the customer at the customer device 110(1) is illustrated. In this example, the NLP engine 162 processes a customer message 602 received from the customer device 110(1). The NLP engine 162 identifies the intent of the customer message 602 as "transfer funds". Further, the contact center server 150 executes a dialog flow 800 of the identified intent—"transfer funds", illustrated in FIG. 8A, to assist the human agent at the agent device 130(1) respond to the customer message 602. The contact center server 150 executes a first node (i.e., a first entity node, in this example) of the dialog flow 800 and provides an automated response recommendation 604 to the human agent at the agent device 130(1). As illustrated in FIG. 6A, the human agent at the agent device 130(1) sends the automated response recommendation 604 "as-is" as an agent response 606 to the customer message 602. Further, the contact center server 150 inputs the automated response recommendation 604 and the agent response 606 as a pair to the classification model 164 to determine if there are any changes between the automated response recommendation 604 and the agent response 606. The classification model 164 outputs "no change" and based on the output of the classification model 164, the tagging engine 168 associates a tag—"used as-is" to the agent response 606 (as illustrated in FIG. 6A).

As a response to the agent response 606, the contact center server 150 receives a customer message 608—"$15000. Sorry it is $1500" from the customer device 110(1). Further, the contact center server 150 executes a second node (i.e., a second entity node, in this example) of the dialog flow 800 and provides an automated response recommendation 610 to the human agent at the agent device 130(1). But, from the customer message 608, the human agent at the agent device 130(1) understands that the customer mentioned $15000 as the transfer amount and later mentioned the transfer amount as $1500. Therefore, the human agent at the agent device 130(1) asks the customer at the customer device 110(1) to reconfirm the transfer amount, by manually composing and sending an agent response 612—"You would like to transfer $1500, is that correct?", instead of using the automated response recommendation 610. In this example, the agent response 612 is not associated with any node of the dialog flow 800 of the intent—"transfer funds". Further, the contact center server 150 inputs the automated response recommendation 610 and the agent response 612 as a pair to the classification model 164 to determine if there are any changes between the automated response recommendation 610 and the agent response 612. The classification model 164 outputs "confirmation message" and based on the output of the classification model 164, the tagging engine 168 associates a tag—"confirmation message" to the agent response 612 (as illustrated in FIG. 6A). After the customer at the customer device 110(1) responds with a "yes" to the agent response 612, the human agent at the agent device 130(1) sends the automated response recommendation 610 "as-is" as an agent response 616. As illustrated in FIG. 6A, the conversation continues until the identified intent—"transfer funds" of the customer is fulfilled.

Further, in the example illustrated in FIG. 6A, the contact center server 150 identifies a pattern when a threshold number of the plurality of conversations 159(1)-159(n) associated with the intent—"transfer funds" comprises one or more agent responses associated with the tag—"confirmation message". When the tag "confirmation message" occurs more than a predefined threshold number of times, the contact center server 150 identifies the pattern as confirmation messages sent to the customers regarding the transfer amount. Subsequently, when the pattern is identified, the contact center server 150 provides a flow modification recommendation to the dialog flow 800 of the intent—"transfer funds", for example, as a notification to one or more enterprise user devices. In one example, the flow modification recommendation comprises a recommendation to add a confirmation node to the dialog flow 800 of the intent—"transfer funds". In another example, the flow modification recommendation comprises a recommendation to add a confirmation node between the first entity node and the second entity node of the dialog flow 800 of the intent—"transfer funds", as illustrated in FIGS. 8B and 8C.

Referring to FIG. 6B, a table of an exemplary conversation data between the human agent at the agent device 130(1) and the customer at the customer device 110(1) is illustrated. In this example, the customer at the customer device 110(1) contacts the contact center server 150 during odd hours of a day, a holiday, peak hours of the day, down time of a contact center application, or the like. In this example, the NLP engine 162 processes a customer message 620 received from the customer at the customer device 110(1) and identifies the intent of the customer message 620 as—"troubleshoot router". Further, the contact center server 150 executes a dialog flow of the identified intent—"troubleshoot router" to assist the human agent at the agent device 130(1) respond to the customer message 620. The contact center server 150 executes a first node (i.e., a first entity node, in this example) of the dialog flow of the intent—"troubleshoot router" and provides an automated response recommendation 622—to the human agent at the agent device 130(1). But, for example, based on the time of the day the customer at the customer device 110(1) contacted the contact center, the human agent at the agent device 130(1) understands that the customer at the customer device 110(1) faced the connectivity issue during, late hours of the day. Therefore, in this example, the human agent at the agent device 130(1) initially empathizes the customer at the customer device 110(1) by manually composing and sending an agent response 624, instead of using the automated response recommendation 622. In this example, the agent response 624 is not associated with any node of the dialog flow of the intent—"troubleshoot router".

Further, the contact center server 150 inputs the automated response recommendation 622 and the agent response 624 as a pair to the classification model 164 to determine if there are any changes between the automated response recommendation 622 and the agent response 624. The classification model 164 outputs "additional message" and based on the output of the classification model 164, the tagging engine 168 associates a tag—"additional message" to the agent response 624 (as illustrated in FIG. 6B). Further, as illustrated in FIG. 6B, after sending the agent response 624, the human agent at the agent device 130(1) sends the automated response recommendation 622 "as-is" as an agent response 626 to the customer at the customer device 110(1). Further, as illustrated in FIG. 6B, the conversation continues until the identified intent—"troubleshoot router" of the customer is fulfilled.

Further, in the example illustrated in FIG. 6B, the contact center server 150 identifies a pattern when a threshold number of plurality of conversations 159(1)-159(n) associated with the intent—"troubleshoot router" comprises one or more agent responses associated with the tag—"additional message". When the tag "additional message" occurs more than a predefined threshold number of times, the contact center server 150 identifies the pattern as additional messages (e.g., empathy) sent to the customers by the human agents. In one example, the contact center server 150 analyzes timestamp information of conversation data for the plurality of conversations 159(1)-159(n) associated with the intent—"troubleshoot router" to identify timing of a day the one or more agent responses associated with the tag—"additional message" is sent to the customers. Subsequently, when the pattern is identified, the contact center server 150 provides a flow modification recommendation to the dialog flow of the intent—"troubleshoot router", for example, as a notification to one or more enterprise user devices. In one example, the flow modification recommendation comprises a recommendation to add a message node to the dialog flow of the intent—"troubleshoot router". In another example, the flow modification recommendation comprises a recommendation to add a message node between an intent node and the first entity node of the dialog flow of the intent—"troubleshoot router". In another example, the flow modification recommendation comprises a recommendation to add a transition condition and a message node to the intent node of the dialog flow of the intent—"troubleshoot router".

Referring to FIG. 6C, a table of an exemplary conversation data between the human agent at the agent device 130(1) and the customer at the customer device 110(1) is illustrated. In this example, the NLP engine 162 processes a customer message 630 received from the customer device 110(1) and identifies the intent of the customer message 630 as "troubleshoot router". Further, the contact center server 150 executes a dialog flow of the intent—"troubleshoot router" to assist the human agent at the agent device 130(1) during the conversation by providing one or more automated response recommendations until the intent—"troubleshoot router" of the customer is fulfilled.

Further, as illustrated in FIG. 6C, after the identified intent—"troubleshoot router" of the customer is fulfilled, the human agent at the agent device 130(1) manually composes and sends an agent response 636— "The warranty of your router expires next week. Would you like to renew the warranty?", instead of using an automated response recommendation 634. In this example, the agent response 636 is not associated with any node of the dialog flow of the intent—"troubleshoot router". In one example, the human agent at the agent device 130(1) identifies from a profile of the customer stored in the CRM database 140 that the warranty of the customer's router is due to expire next week and proactively asks (by sending the agent response 636) if the customer at the customer device 110(1) wants to renew the router warranty.

Further, the contact center server 150 inputs the automated response recommendation 634 and the agent response 636 as a pair to the classification model 164 to determine if there are any changes between the automated response recommendation 634 and the agent response 636. The classification model 164 outputs "new intent—troubleshoot router" and based on the output of the classification model 164, the tagging engine 168 associates a tag—"new intent—renew warranty" to the agent response 636 (as illustrated in FIG. 6C). After the customer at the customer device 110(1) responds with a "yes" to the agent response 636, the human agent at the agent device 130(1) manually triggers an execution of a dialog flow of an intent—"renew warranty". Further, the human agent at the agent device 130(1) continues the conversation until the intent—"renew warranty" is fulfilled.

Further, in the example illustrated in FIG. 6C, the contact center server 150 identifies a pattern when a threshold number of the plurality of conversations 159(1)-159(n) associated with the intent—"troubleshoot router" comprises one or more agent responses associated with the tag—"new intent—renew warranty". When the tag "new intent—renew warranty" occurs more than a predefined threshold number of times, the contact center server 150 identifies the pattern as messages sent to the customers regarding renewing warranty of the router. Subsequently, when the pattern is identified, the contact center server 150 provides a flow modification recommendation to the dialog flow of the intent—"troubleshoot router", for example, as a notification to one or more enterprise user devices. In one example, the flow modification recommendation comprises a recommendation to add an intent node (e.g., a follow-up intent) to the dialog flow of the intent—"troubleshoot router". In another example, the flow modification recommendation comprises a recommendation to add an intent node (e.g., a follow-up intent) to a final node of the dialog flow of the intent—"troubleshoot router". In another example, the flow modification recommendation comprises a recommendation to add a transition condition to a final node of the dialog flow of the intent—"troubleshoot router" for checking expiry of router warranty of the customer.

FIG. 7 is a table of an exemplary association between outputs of the classification model 164 and tags associated by the tagging engine 168 to the agent responses. In one example, the association between the outputs of the classification model 164 and the tags associated by the tagging engine 168 to the agent responses are stored in the memory 154.

Figure 8A:
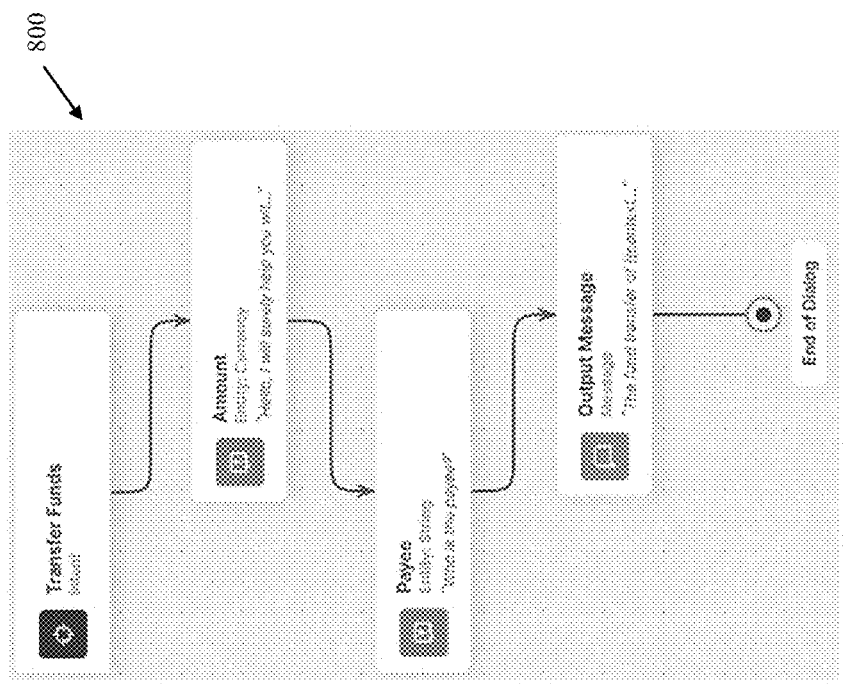
FIG. 8A is a screenshot of an example of a dialog flow configured for an exemplary intent—"transfer funds".
Figure 8B:
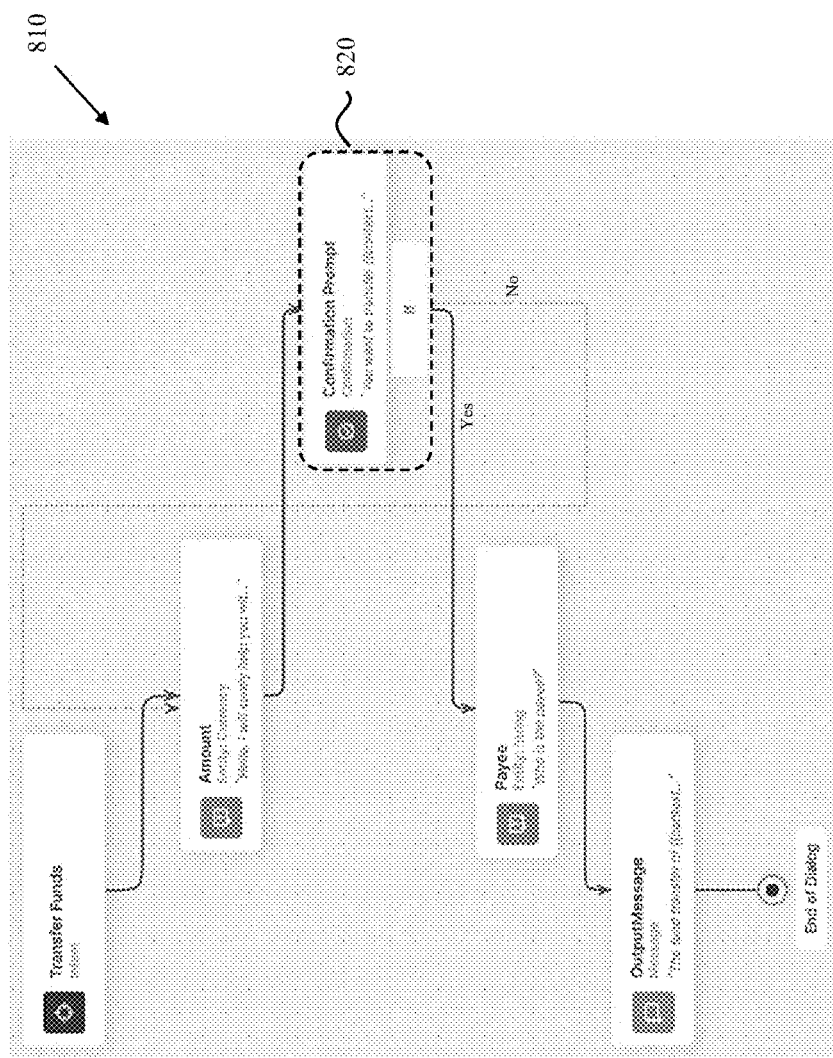
FIGS. 8B-8C are screenshots of a modified dialog flow of the exemplary intent—"transfer funds" that are recommended to an enterprise user.
Figure 8C:
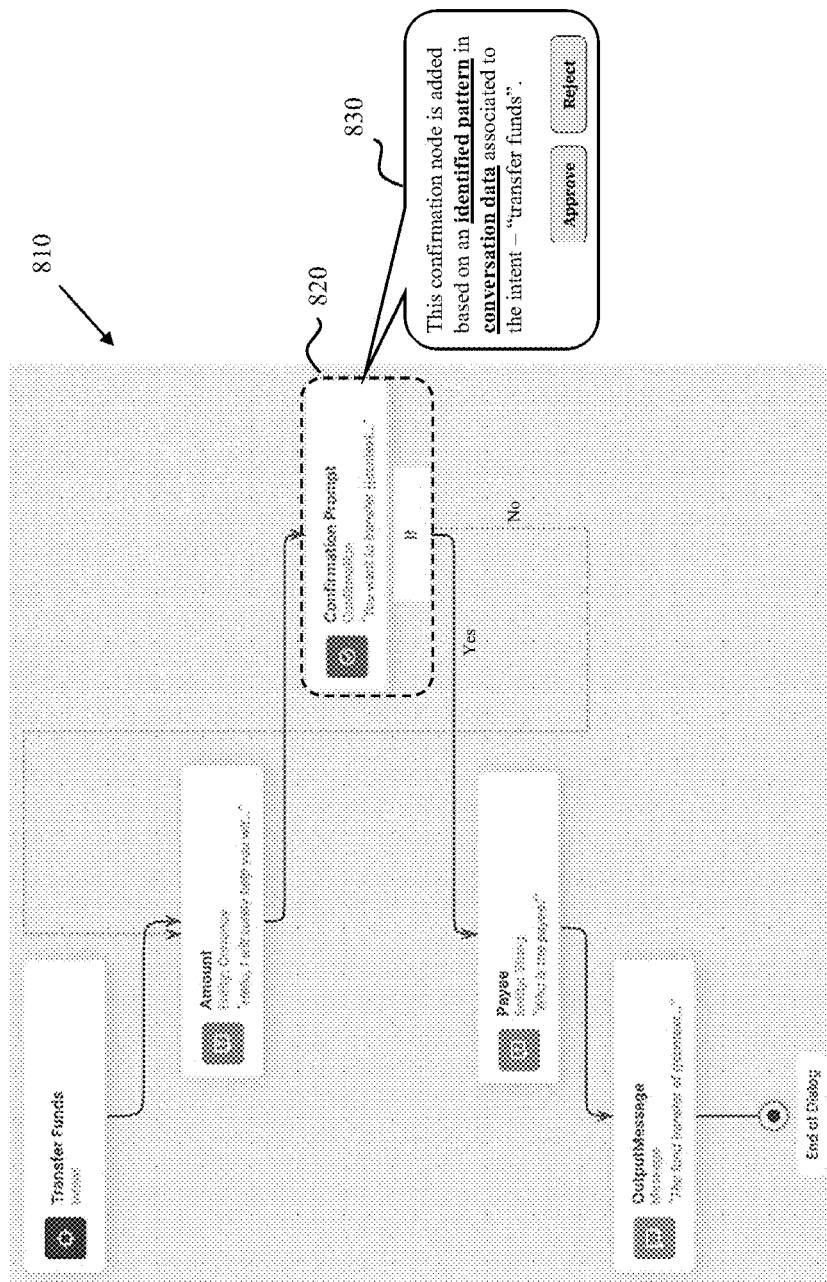

FIG. 8A is a screenshot of the dialog flow 800 configured for an exemplary intent—"transfer funds". As illustrated in FIG. 8A, the dialog flow 800 configured for the intent—"transfer funds" comprises: an intent node—"Transfer Funds"; a first entity node—"Amount" of entity type "Currency"; a second entity node—"Payee" of entity type "String"; and a message node—"Output Message".

FIG. 8B is a screenshot of a modified dialog flow 810 of the exemplary intent—"transfer funds" that is recommended to an enterprise user at an enterprise device. In this example, the modified dialog flow 810 is a modified version of the dialog flow 800 configured for the intent—"transfer funds". In the example described in FIG. 6A, the contact center server 150 provides to the enterprise user the flow modification recommendation (i.e., the modified dialog flow 810) to the dialog flow 800 of the intent—"transfer funds" based on the identified pattern in the one or more agent responses in the one or more conversation data of the conversation data for the plurality of conversations 159(1)-159(n) associated with the intent—"transfer funds". As illustrated in FIG. 8B, the modified dialog flow 810 comprises a confirmation node—"Confirmation Prompt" 820 that is added to the dialog flow 800 in between the first entity node—"Amount" and the second entity node—"Payee" and indicated to the enterprise user by a dotted line, although the modification may be indicated to the enterprise user in other ways such as, for example, by highlighting added node(s) in color, by showing the added node(s) as a pop-out, or the like. In this example, the enterprise user at the enterprise user device reviews the modified dialog flow 810 recommended by the contact center server 150 and accordingly modifies the dialog flow 800 configured for the intent—"transfer funds" in the virtual assistant platform 160.

FIG. 8C is a screenshot of the modified dialog flow 810 of the exemplary intent—"transfer funds" that is recommended to the enterprise user at the enterprise user device. In this example, as illustrated in FIG. 8C, the modified dialog flow 810 is recommended to the enterprise user along with a message 830 comprising selectable options "approve" and "reject". Further, as illustrated in FIG. 8C, the message 830 comprises hyperlinks "identified pattern" and "conversation data". For example, the enterprise user may review the pattern identified by the contact center server 150 and the conversation data in which the contact center server 150 identified the pattern, by clicking on the hyperlinks "identified pattern" and "conversation data". In one example, when the enterprise user approves the modified dialog flow 810 by selecting the approve option in the message 830, the contact center server 150 automatically replaces the dialog flow 800 configured for the intent—"transfer funds" in the virtual assistant platform 160 with the modified dialog flow 810. In another example, the enterprise user rejects the modified dialog flow 810 recommended by the contact center server 150 by selecting the reject option in the message 830.

In accordance with the examples described in the present disclosure, it may be understood that by automatically identifying patterns in the tags associated to the agent responses in the conversation data for the plurality of conversations 159(1)-159(n) and providing to the enterprise users the flow modification recommendations to the dialog flows of the intents, the amount of time required by the enterprise users to manually review the conversation data for the plurality of conversations 159(1)-159(n) and modify the dialog flows of the intents is significantly reduced. In one example, the enterprise users can quickly modify the dialog flows in the virtual assistant platform 160 by reviewing the identified patterns and the flow modification recommendations provided by the contact center server 150. Further, by modifying the dialog flows in the virtual assistant platform 160 based on the identified patterns, the human agents at the plurality of agent devices 130(1)-130(n) may be provided with better recommendation data 316, which in turn allows the human agents at the plurality of agent devices 130(1)-130(n) to resolve customer requests quickly and efficiently.

Further, the tags associated to the messages in the conversation data for the plurality of conversations 159(1)-159(n) provides a way to the enterprise users to quickly search, filter, review, analyze, and/or classify the conversations. Further, contact centers may use the tags associated to the agent responses in the conversation data for the plurality of the conversations 159(1)-159(n) to learn about, for example, behavior of the human agents towards the customers, usage of automated response recommendations by the human agents, pain points of the human agents, frequently modified response recommendations by the human agents, scenarios in which the automated response recommendations are modified by the human agents, or the like. Further, the enterprise users may use the tags associated to the agent responses in the conversation data for the plurality of the conversations 159(1)-159(n) to analyze and identify the top human agents whose modifications can be used to modify the dialog flows of the intents. Furthermore, the developers or the system administrators may use the tags associated to the agent responses in the conversation data for the plurality of the conversations 159(1)-159(n) to filter and analyze the conversations to determine gaps in the dialog flows of the intents and bridge such gaps to provide improved automated recommendation data to the human agents.

In accordance with the methods, systems, and non-transitory computer-readable mediums described above, the contact centers may reduce average handling time (AHT) and improve key performance indicators (KPIs) such as, for example, customer satisfaction score (CSAT), customer effort score (CES), net promoter score (NPS), first-call resolution, service level, contact quality, and human agents' performances, although other KPIs may be measured.

Having thus described the basic concept of the invention, it will be rather apparent to those skilled in the art that the foregoing detailed disclosure is intended to be presented by way of example only and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method comprising:
    managing, by a contact center server, conversation data for a plurality of conversations between a plurality of agent devices and a plurality of customer devices;
    providing to the plurality of agent devices, by the contact center server, recommendation data comprising one or more automated response recommendations to one or more customer messages received as part of the conversation data for the plurality of conversations by executing one or more dialog flows corresponding to the one or more customer messages;
    determining for each of the one or more customer messages, by the contact center server, using a classification model, when there are one or more changes between the corresponding one or more automated response recommendations and corresponding one or more agent responses transmitted as part of the conversation data for the plurality of conversations;

associating, by the contact center server, one or more tags to the one or more agent responses when the one or more changes are determined;

identifying, by the contact center server, one or more patterns in the one or more tags associated to the one or more agent responses; and providing, by the contact center server, one or more flow modification recommendations to the one or more dialog flows to one or more enterprise user devices based on the identified one or more patterns.

2. The method of claim 1, wherein the one or more dialog flows corresponding to the one or more customer messages are executed based on one or more intents of the one or more customer messages.

3. The method of claim 1, wherein the one or more automated response recommendations comprise: one or more message prompts configured in the one or more dialog flows, or one or more content snippets retrieved by executing one or more web requests configured in the one or more dialog flows.

4. The method of claim 1, wherein the one or more patterns are identified when the one or more tags associated to the one or more agent responses occur more than a predefined threshold number of times.

5. The method of claim 1, wherein the one or more flow modification recommendations comprise at least one of: addition, deletion, or modification of one or more nodes to the one or more dialog flows.

6. The method of claim 1, wherein the identifying the one or more patterns further comprises:

grouping, by the contact center server, the conversation data for the plurality of conversations into one or more conversation groups based on:
an intent of each of the conversation data for the plurality of conversations; or
an execution stage of the intent of each of the conversation data for the plurality of conversations which outputs the one or more automated response recommendations that are: not used or changed, at the plurality of agent devices.

7. A contact center server comprising:
one or more processors; and
a memory coupled to the one or more processors which are configured to execute programmed instructions stored in the memory to:
manage conversation data for a plurality of conversations between a plurality of agent devices and a plurality of customer devices;
provide to the plurality of agent devices, recommendation data comprising one or more automated response recommendations to one or more customer messages received as part of the conversation data for the plurality of conversations by executing one or more dialog flows corresponding to the one or more customer messages;
determine for each of the one or more customer messages, using a classification model, when there are one or more changes between the corresponding one or more automated response recommendations and corresponding one or more agent responses transmitted as part of the conversation data for the plurality of conversations;
associate one or more tags to the one or more agent responses when the one or more changes are determined;
identify one or more patterns in the one or more tags associated to the one or more agent responses; and
provide one or more flow modification recommendations to the one or more dialog flows to one or more enterprise user devices based on the identified one or more patterns.

8. The contact center server of claim 7, wherein the one or more dialog flows corresponding to the one or more customer messages are executed based on one or more intents of the one or more customer messages.

9. The contact center server of claim 7, wherein the one or more automated response recommendations comprise: one or more message prompts configured in the one or more dialog flows, or one or more content snippets retrieved by executing one or more web requests configured in the one or more dialog flows.

10. The contact center server of claim 7, wherein the one or more patterns are identified when the one or more tags associated to the one or more agent responses occur more than a predefined threshold number of times.

11. The contact center server of claim 7, wherein the one or more flow modification recommendations comprise at least one of: addition, deletion, or modification of one or more nodes to the one or more dialog flows.

12. The contact center server of claim 7, wherein to identify the one or more patterns, the one or more processors are further configured to:
group the conversation data for the plurality of conversations into one or more conversation groups based on:
an intent of each of the conversation data for the plurality of conversations; or
an execution stage of the intent of each of the conversation data for the plurality of conversations which outputs the one or more automated response recommendations that are: not used or changed, at the plurality of agent devices.

13. A non-transitory computer-readable medium storing instructions which when executed by one or more processors, causes the one or more processors to:
manage conversation data for a plurality of conversations between a plurality of agent devices and a plurality of customer devices;
provide to the plurality of agent devices, recommendation data comprising one or more automated response recommendations to one or more customer messages received as part of the conversation data for the plurality of conversations by executing one or more dialog flows corresponding to the one or more customer messages;
determine for each of the one or more customer messages, using a classification model, when there are one or more changes between the corresponding one or more automated response recommendations and corresponding one or more agent responses transmitted as part of the conversation data for the plurality of conversations;
associate one or more tags to the one or more agent responses when the one or more changes are determined;
identify one or more patterns in the one or more tags associated to the one or more agent responses; and
provide one or more flow modification recommendations to the one or more dialog flows to one or more enterprise user devices based on the identified one or more patterns.

14. The non-transitory computer-readable medium of claim 13, wherein the one or more dialog flows corresponding to the one or more customer messages are executed based on one or more intents of the one or more customer messages.

15. The non-transitory computer-readable medium of claim 13, wherein the one or more automated response recommendations comprise: one or more message prompts configured in the one or more dialog flows, or one or more content snippets retrieved by executing one or more web requests configured in the one or more dialog flows.

16. The non-transitory computer-readable medium of claim 13, wherein the one or more patterns are identified when the one or more tags associated to the one or more agent responses occur more than a predefined threshold number of times.

17. The non-transitory computer-readable medium of claim 13, wherein the one or more flow modification recommendations comprise at least one of: addition, deletion, or modification of one or more nodes to the one or more dialog flows.

18. The non-transitory computer-readable medium of claim 13, wherein to identify the one or more patterns, the one or more processors are further configured to execute the instructions stored in the non-transitory computer-readable medium to:
group the conversation data for the plurality of conversations into one or more conversation groups based on:
an intent of each of the conversation data for the plurality of conversations; or
an execution stage of the intent of each of the conversation data for the plurality of conversations which outputs the one or more automated response recommendations that are: not used or changed, at the plurality of agent devices.

* * * * *